(No Model.)
F. J. MACHALSKI.
APPARATUS FOR EXTRACTING FAT AND GLUE.
No. 516,769. Patented Mar. 20, 1894.
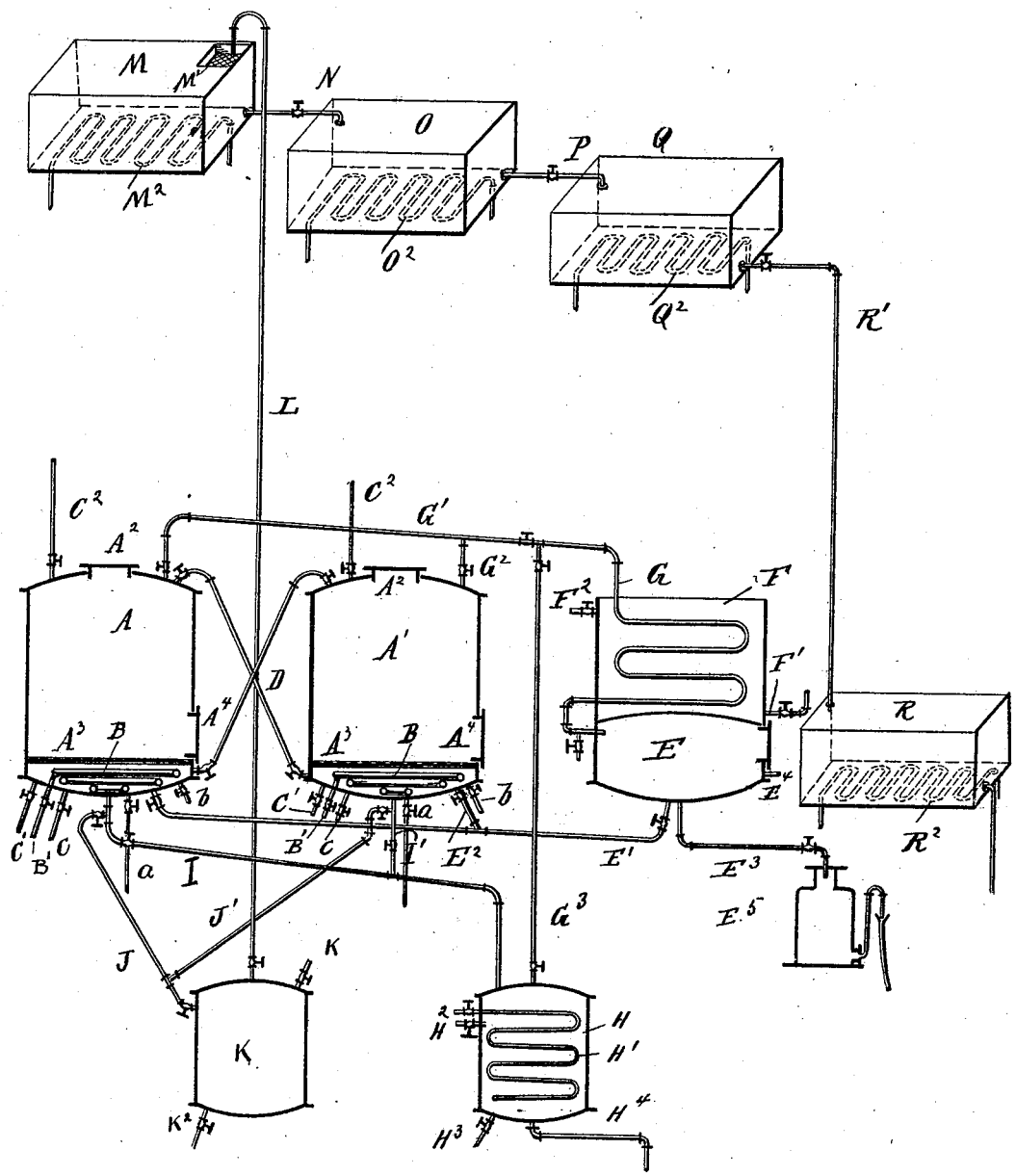
WITNESSES:
INVENTOR
F. J. Machalski
BY
ATTORNEYS.

UNITED STATES PATENT OFFICE.

FLORENTIN J. MACHALSKI, OF BROOKLYN, NEW YORK, ASSIGNOR OF ONE-HALF TO THEODORE KORNOBIS, OF SAME PLACE.

APPARATUS FOR EXTRACTING FAT AND GLUE.

SPECIFICATION forming part of Letters Patent No. 516,769, dated March 20, 1894.

Application filed November 10, 1893. Serial No. 490,608. (No model.)

*To all whom it may concern:*

Be it known that I, FLORENTIN J. MACHALSKI, a subject of the Emperor of Austria-Hungary, and a resident of Brooklyn, Kings county, State of New York, have invented a new and Improved Apparatus for Extracting Fat and Glue, of which the following is a specification.

The object of my invention is to provide a new and improved apparatus for treating substances containing fat and glue in such a manner that the fat and glue are extracted separately for further use in the arts, in a continuous operation.

In the accompanying drawings, a diagram view of my improved apparatus for extracting fat and glue is shown, parts being shown in a vertical section and others in perspective.

Two receptacles A and A' are provided for receiving the articles to be treated, each receptacle having a filling opening $A^2$, a screen partition $A^3$, a short distance above the bottom, and a side discharge-opening $A^4$ directly above the screen. A steam-coil B is located in each receptacle A below the screen partition $A^3$, and is connected with a pipe B' for admitting live steam into said coil, said pipes B' having suitable cocks. A pipe C is connected with the bottom of each receptacle for admitting the water into the receptacle, said pipes also having suitable cocks, and with the bottom of each receptacle a further pipe C' is connected for admitting steam into the receptacle. A pipe $C^2$, having a suitable cock, is connected with the top of each receptacle for permitting the escape of the air. The top of each receptacle A and A' is connected with the bottom of the adjacent receptacle by a pipe D, each of which pipes D has a cock at the top and bottom, by means of which pipes the steam and glutinous solution can pass from one receptable into the other. A tank E for containing a solvent, such as benzine, gasoline or ether, is connected by a pipe E' and branch pipe $E^2$ with the bottoms of the two receptacles A and A'. The bottom of said tank E is also connected by a pipe $E^3$ with a water-bottle $E^5$. The steam pipe $E^4$ serves for admitting steam to force out the solvent. A condensing vat F is built up above the tank E and is provided at the bottom with an inlet-pipe F' for cold water, and an outlet-pipe at the top for warm water. A condensing coil G is arranged in the vat F and is connected with the pipe G' and the branch pipe $G^2$, all having suitable cocks, and with the tops of the receptacles A and A', and the lower end of the condensing coil G is connected with the tank E. The pipe $G^3$ extends from the pipe G' to a fat receiver H, containing a steam-coil H', pipe $H^2$ for admitting steam into the receiver, a pipe $H^3$ for drawing off the water of condensation, and the pipe $H^4$ for drawing off the fat. The fat receiver is connected by the pipe I and the branch pipe I' with the bottoms of the receptacles A and A'. The bottoms of said receptacles are also connected by the pipes J and J' with a glue receiver K, connected with the pipe K' for admitting steam, and with the blow-off cock $K^2$. Said glue receptacle K is connected with a pipe L extending from the top of said receptacle K up to a suitable glue evaporating tank M having a screen M' upon which the glue is discharged by the pipe L. A steam-coil $M^2$ is arranged in the bottom of the evaporating tank M. The pipe N is connected with the bottom of the evaporating tank M, for conducting the glue into a tank O in which the glue is treated with sulphurous acid, said tank O also containing a steam-coil $O^2$. A pipe P connects the bottom of the tank O with the clarifying tank Q, containing a steam-coil $Q^2$, and a pipe R' connects the bottom of the clarifying tank Q with the second evaporating tank R, containing a steam-coil $R^2$.

The operation is as follows: The substances from which the fat and glue are to be extracted, are placed in the receptacles A and A' and the latter carefully closed and a greater or less quantity of solvent conducted into the same. The contents of the receptacles are then heated either by means of steam admitted into the coils B, or steam admitted directly into the receptacles and the gases of the solvent are now under pressure within the receptacles, and as they have an affinity for the fatty particles contained in the substances in the said receptacles, said fatty particles are absorbed in and dissolved by the solvent. When all the fatty particles have been dissolved, the solvent is heated to such a high degree that it is evaporated and the vapors pass off through the pipes G' and G², into the condensing coil G, into which they are condensed and then flow into the tank E. Then the cocks are opened to permit the fat to run into the fat receiver H, where the same is again heated either by means of steam admitted in the coil H', or by means of steam admitted direct into said fat receptacle. The particles of the solvent still remaining in the vat are thereby evaporated and pass off through the pipes G³ and G' into the condensing-coil. The water of condensation collected in the bottom of the receptacle H is drawn off through the pipe H³ and the fat is drawn off through the pipe H⁴, and is used in the arts for suitable purposes. After the fat has all been removed from the substances in the receptacles A and A', hot water is admitted into the receptacles and heated to a still higher degree, either by the admission of steam directly in the receptacles, or by the admission of the steam in the coil B; and this hot water dissolves and takes up all the glue or gelatine contained in the substances. This solution of glue or gelatine is then run through the pipes J, J' into the receiver K and is forced by steam through the pipe L upon the screen M' of the evaporating tank M. In this tank the greater part of the water is evaporated and the solution of glue is run through the pipe N into the tank O, where it is treated with the sulphurous acid for the purpose of clarifying it and bleaching it, and is then run through the pipe P into the tank Q, where it is treated with alum and caustic soda for further clarifying it, and is then run through the pipe R into the tank R', where the remaining water is evaporated, so as to obtain glue in condition for further treatment. The water accumulating in the solvent tank F is drawn off at proper intervals through the pipe E³ into the water-bottle F⁵. The pipes $a$ serve to draw off the water of condensation from the steam coils B and $b$ are the blow-off cocks of the receptacles A and A'. After all the fat and glue have been extracted from the substances in the receptacles A, A', said receptacles are emptied and prepared for another discharge.

This apparatus can also be used for substances containing oil, colors, &c.

Having thus described my invention, I claim as new and desire to secure by Letters Patent—

In an apparatus for extracting fats and glue from substances containing them, the combination with receptacles for receiving the substances to be treated, a steam-coil in the bottom of each receptacle for heating the contents of said receptacle, a pipe for conducting solvents into the receptacles, a pipe for carrying off the vapors of said solvents to a condenser, a pipe for conducting water into the receptacles, a receiver for the extracted fat located below the receptacles, a receiver for the glue solution located below the receptacles, a series of glue solution clarifying and condensing tanks located one above the other, so that the solution passes by gravity from one to the other, a pipe for conducting the glue solution from the receiver to the said clarifying and condensing tanks and a pipe for admitting a medium under pressure into said glue-solution receiver for the purpose of forcing the glue solution from the receiver into the clarifying and condensing tanks, substantially as set forth.

In testimony that I claim the foregoing as my invention I have signed my name in presence of two subscribing witnesses.

FLORENTIN J. MACHALSKI.

Witnesses:
OSCAR F. GUNZ,
K. R. BRENNAN.